United States Patent Office 3,040,000
Patented June 19, 1962

3,040,000
POLYESTER COMPOSITION
James R. Stephens, Gary, and Richard E. Van Strien, Griffith, Ind., and Ronald L. Broadhead, Park Forest, Ill., assignors to Standard Oil Company, Chicago, Ill., a corporation of Indiana
No Drawing. Filed May 28, 1959, Ser. No. 816,645
2 Claims. (Cl. 260—77)

This invention relates to unsaturated polyester resins derived from trimellitic anhydrides, glycols and allyl alcohols, which resins are readily convertible to water soluble forms.

An object of the invention is a polyester resin containing appreciable amount of unsaturation. Another object of the invention is an unsaturated polyester resin containing a significant amount of unreacted carboxyl groups. A particular object of the invention is a method of preparing an unsaturated polyester resin utilizing trimellitic anhydride, glycol, and an allyl alcohol. Still another object of the invention is a method of preparing such an unsaturated polyester resin by simultaneous reaction of trimellitic anhydride, glycol, and an allyl alcohol. Other objects will become apparent in the course of the detailed description of the invention.

An unsaturated polyester resin containing significant amounts of free carboxyl groups as determined by acid number is prepared by (1) condensing a glycol containing from 2 to 9 carbon atoms and trimellitic anhydride in a molar ratio of glycol:anhydride charged on the order of 1–1.4:1, in an inert atmosphere and with continuous withdrawal of water produced in said reaction, at a temperature from about 90° C. to 150° C. for a time to substantially complete the condensation reaction and (2) reacting the product of (1) with an allyl alcohol at a temperature from about 90° C. to 150° C., with continuous withdrawal of water produced in said reaction, for a time to produce a polyester product of the desired acid number, and (3) recovering the polyester resin product.

The glycols which are suitable for use in the preparation of the resin of the invention contain from 2 to 9 carbon atoms and include not only the simple glycols but also the ether glycols. Examples of suitable glycols are ethylene glycols, butylene glycol, nonanediol, diethylene glycol, tetraethylene glycol, and tripropylene glycol. The butyene glycols and diethylene glycols are particularly suitable.

The trimellitic anhydride and the defined glycol are reacted at very moderate polyester reaction conditions which avoid any cross-linking reaction—this cross-linking reaction is commonly called gelation. The reaction is carried out in an inert atmosphere at a temperature between about 90° C. and 150° C. and water produced in the reaction is continuously withdrawn. In the case of lower boiling glycols or where the reaction is carried out in the presence of a non-reactive solvent, condenser means are provided for returning glycol and/or solvent to the reaction zone. The reaction is continued for a time determined by the temperature of reaction and the particular glycol charged. Most usually the reaction is continued until just short of the appearance of cross-linking as evidenced by an abrupt increase of viscosity of the material in the reaction zone.

The trimellitic anhydride and the glycol are charged in a molar ratio of glycol:anhydride of at least 1:1; preferably an excess of glycol is charged—generally the maximum glycol:anhydride ratio is on the order of 1.4:1. At these ratios the reaction time is continued until the point of abrupt viscosity increase is reached; or by measuring the amount of water produced and stopping when the theoretical amount has been recovered. (It is to be understood that the acid number obtained at the completion of the reaction is dependent upon the excess of glycol charged and also upon the particular glycol charged.)

The condensation reaction at these very moderate conditions is speeded up by the presence of a condensation catalyst such as sulfuric acid or a sulfonic acid. Toluene sulfonic acid is particularly suitable.

The condensation reaction may be carried out in the presence of a solvent which also acts to remove water of reaction by azeotrope formation. The reaction zone is then preferably provided with means for condensing the azeotrope and separation of the recovered solvent from the water and means for returning the solvent to the condensation zone. The low boiling benzene hydrocarbons are particularly suitable for this purpose. The low boiling benzene hydrocarbons are understood to be those which boil below about 150° C. Benzene and toluene are particularly suitable because their low boiling points permit easy separation by distillation from the condensate or the final unsaturated polyester resin.

The condensate product of the reaction between trimellitic anhydride and glycol is reacted with an allyl alcohol. The amount of allyl alcohol utilized is that needed to give the desired acid number of the final unsaturated polyester resin. Excess allyl alcohol may be charged and this excess is readily removed when the reaction has proceeded to the desired acid number product resin. The reaction between the allyl alcohol and the condensate is carried out at about the same temperature conditions and other operating conditions as the condensation reaction itself. Preferably, the final reaction is carried out in the presence of a low boiling benzene hydrocarbon solvent in order to facilitate reaching the final desired acid number.

The acid number of the unsaturated polyester resin product generally is from 20 to 140 (acid number is the mg. of KOH per gram of resin). It has been found that attempts to produce an acid number lower than 20 imposes extremely crucial control problems in order to avoid gelation. Higher acid numbers permit easier conversion of the resin product to water soluble form by reaction with ammonia or lower molecular weight aliphatic amines.

The unsaturated polyester resin product of the invention may be used for the formation of surface coatings by direct application of the resin or by application of the solution of the resin in a suitable solvent. The lower boiling benzene hydrocarbons are particularly suitable as solvents. The solution of the resin may be applied without fillers or pigments or for opaque enamel type finishes pigments and fillers may be incorporated into the solution.

In the cases of lower acid number resin products which contain the larger amounts of unsaturation, air drying films are obtainable. The films are also amenable to rapid drying by the use of elevated temperatures such as used for baked film formation, i.e., on the order of 149° C. (300° F.).

It has also been found that the two-step method of preparation of the unsaturated polyester resin is not necessary when the reaction conditions are very carefully controlled. Thus the defined trimellitic anhydrides, glycol and allyl alcohol are charged together into a reaction vessel. The reaction vessel also contains an amount of the low boiling benzene hydrocarbon sufficient to dissolve the reactants. The reaction is carried out in the presence of a low boiling benzene hydrocarbon under conditions to maintain the hydrocarbon in the reaction zone while continuously removing water formed in the reaction. The reaction is held at a temperature between about 80° C. and about 110° C. until the desired acid number product resin has been obtained. In this simultaneous reaction method the defined glycol and the anhydride are charged in a mole ratio from 1–1.4:1. The allyl alcohol is charged preferably in a mole ratio of allyl alcohol to anhydride of at least 1. It is preferred to utilize the reactants and to carry out the reaction until the product resin has an acid number 20 to 140.

The amount of low boiling benzene hydrocarbon charged is held to the minimum needed to provide the necessary solution of reactants therein; more than this amount may be utilized if the cost of distillative removal of said benzene hydrocarbon from the product resin is not an important factor.

Example 1

A mixture of 481 g. (2.38 moles) of trimellitic anhydride, 186 g. (2.82 moles) of ethylene glycol, and 100 ml. of benzene was heated with intermittent stirring for about 20 hours at 90–100° C. Water of esterification was removed azeotropically. Reaction proceeded very slowly, hence a catalyst of 10.5 g. of p-toluenesulfonic acid monohydrate was then added. Heating and stirring was continued another 5 hours. The formation of the condensate was then nearly complete, as measured by water eliminated. One hundred seventy-four grams (2.85 moles) of allyl alcohol was added and heating and stirring continued, gradually raising the temperature to 140° C. to hasten reaction. In about 16 hours reaction was complete as measured by the acid number, which was 20.8. At this degree of reaction, the product, an unsaturated polyester, was soluble in both acetone and styrene.

Example 2

Five hundred grams (2.5 moles) of trimellitic anhydride, 191 g. (2.9 moles) of ethylene glycol, and 100 ml. of xylene were mixed and heated 3½ hours at 140° C. Water of esterification was removed azeotropically. The acid number at the end of this time was 257. The condensate formed was not isolated. Approximately 210 g. (3.4 moles) of allyl alcohol and 100 ml. of benzene was added and heating and stirring continued, with azeotropic removal of water, until the acid number of the product was 126. Excess benzene, xylene, and allyl alcohol were then blown out by a nitrogen purge. The product was a colorless low melting solid resin.

Example 3

One hundred forty-two grams (0.70 mole) of trimellitic anhydride, 56.3 g. (0.70 mole) of propylene glycol, 42.9 g. (0.70 mole) of allyl alcohol, 3.1 g. of p-toluenesulfonic acid monohydrate, 50 ml. of benzene, and 0.04 g. of hydroquinone were mixed and heated at 100° C. Water of esterification was removed azeotropically. Reaction was continued until the acid number was 85.2. Excess allyl alcohol and benzene were then boiled out. The product was a viscous liquid.

Example 4

Triethylene glycol (90.2 grams), 19.6 grams isooctyl alcohol and trimellitic anhydride (96.06 grams) were heated together at 160–170° C. for six hours. The mixture was allowed to cool to room temperature and 70 milliliters allyl alcohol, 35 milliliters benzene and 2.0 grams para-toluenesulfonic acid were added. The charge was refluxed at 95–96° C. for 34 hours and then the excess allyl alcohol and benzene were stripped off. The product was a brown viscous fluid resin with an acid number of 42. An aqueous solution was prepared by adding 10 grams of the resin to a solution of 0.70 gram 2-amino-2-methyl-1-propanol in 90 milliliters of distilled water and warming to 40° C. This solution baked out in 4 hours at 300° F. to give a tough, hard pliable coating with good water resistance.

Example 5

Five hundred grams of trimellitic anhydride, 191 grams of ethylene glycol and 100 ml. of xylene were mixed and heated 3½ hours at 140° C. Water of esterification was removed azeotropically. The acid number at the end of this time was 257. Approximately 210 grams of allyl alcohol and 100 ml. of benzene were added and heating and stirring continued with azeotropic removal of water until the acid number of the product was 126. The final acid number of the product after the xylene, benzene and excess allyl alcohol were blown out by a nitrogen purge was 180. Water solutions were prepared according to the following procedures.

A. Forty grams of the resin were dissolved in a solution of 7.5 grams 2-amino-2-methyl-1-propanol in 160 ml. of distilled water. Glycerol (2.8 grams) and 36.0 grams of titanium dioxide pigment FF were added and the mixture was milled overnight using glass beads for the grinding. The product was coated on a glass plate and baked for one hour at 290–300° F. A hard, tough, white coating with good gloss was obtained. The coating showed no attack by water after 10 hours.

B. 10.0 grams of the resin were dissolved in a solution of 1.7 grams 2-amino-2-methyl-1-propanol in 90 ml. distilled water. Glycerol (0.65 gram) was added and the solution baked for one hour at 290–300° F. on glass plate to give a very hard almost colorless film which showed no attack by water after 7 hours. There was slight attack after 20 minutes to a 1% solution of "Tide."

We claim:

1. An unsaturated polyester resin prepared by (1) condensing an alkylene glycol containing from 2 to 9 carbon atoms and trimellitic anhydride in a molar ratio of glycol:anhydride charged on the order of 1–1.4:1, in an inert atmosphere and with continuous withdrawal of water produced in said reaction, at a temperature from about 90° C. to 150° C. for a time to substantially complete the condensation reaction and (2) reacting the product of (1) with allyl alcohol in a mole ratio to anhydride charged of at least 1 at a temperature from about 90° C. to 150° C. with continuous withdrawal of water produced in said reaction, for a time to produce a polyester product of the desired acid number from 20 to 140, and (3) recovering the polyester resin product which product is characterized by the ability to form a water-soluble resin by reaction with material from the class consisting of aqueous ammonia, lower molecular weight aliphatic amines, and alkanolamines.

2. The resin of claim 1 wherein said glycol is ethylene glycol.

References Cited in the file of this patent

UNITED STATES PATENTS

| | | |
|---|---|---|
| 1,921,756 | Kienle | Aug. 8, 1933 |
| 2,280,242 | Kropa et al. | Apr. 21, 1942 |
| 2,407,479 | D'Alelio | Sept. 10, 1946 |
| 2,418,633 | Gould | Apr. 8, 1947 |
| 2,562,878 | Blair | Aug. 7, 1951 |
| 2,936,297 | Bavley | May 10, 1960 |

FOREIGN PATENTS

| | | |
|---|---|---|
| 881,823 | France | Feb. 4, 1943 |